US010607432B1

(12) United States Patent
Agrawal et al.

(10) Patent No.: US 10,607,432 B1
(45) Date of Patent: Mar. 31, 2020

(54) LOCKING A TOUCH SCREEN OF A MOBILE DEVICE

(71) Applicant: MOTOROLA MOBILITY LLC, Chicago, IL (US)

(72) Inventors: Amit Kumar Agrawal, Bangalore (IN); Daniel Spiewak Rempel Finimundi, Sao Paulo (BR); Alexandre Neves Creto, Sao Paulo (BR); Mauricio Dias Moises, Sao Paulo (BR)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 16/560,836

(22) Filed: Sep. 4, 2019

(51) Int. Cl.
*G06K 9/00* (2006.01)
*G07C 9/00* (2020.01)

(52) U.S. Cl.
CPC ..... *G07C 9/00563* (2013.01); *G06K 9/00013* (2013.01); *G06K 9/00221* (2013.01)

(58) Field of Classification Search
CPC .................................. G07C 9/00; G06K 9/00
See application file for complete search history.

(56) References Cited

U.S. PATENT DOCUMENTS 9,807,694 B2 * 10/2017 Yoon ..................... G06F 3/0488
2017/0168645 A1 * 6/2017 Kang .................. G06F 3/04883
2018/0157395 A1 * 6/2018 Mhun ..................... G06F 21/36

\* cited by examiner

Primary Examiner — Michael T Vu
(74) Attorney, Agent, or Firm — Yudell Isidore PLLC (57) ABSTRACT

A method, a mobile device, and a computer program product for locking a touch screen of a mobile device. The method includes playing video on a display, detecting movement of the mobile device and calculating a movement value. The method further includes determining if the movement value is greater than a movement value threshold and in response to determining that the movement value is greater than the movement value threshold, triggering a sensor component to detect activity data associated with a current use of the mobile device. The method further includes determining if the detected activity data matches reference activity data corresponding to use of the mobile device by a specific user of the mobile device and in response to determining that the detected activity data does not match the reference activity data, rejecting inputs to the touch screen to prevent interruption of the playing of the video.

20 Claims, 6 Drawing Sheets

LOCKING A TOUCH SCREEN OF A MOBILE DEVICE

BACKGROUND

1. Technical Field

The present disclosure generally relates to electronic devices and in particular to locking a touch screen of a mobile device.

2. Description of the Related Art

Modern personal devices, such as cell phones, are used to watch videos and other media on a display screen. The display screen typically incorporates a touch screen that allows a user to provide input by touching areas of the display. Unfortunately, touching the screen during the viewing of videos can trigger unwanted actions by the device, such as stopping or ending the video being played. For example, if a cell phone is playing a video and is being held by a child, if the child touches the touch screen, the video may stop or the cell phone may take some other unwanted action, such as opening a different application screen, depending upon the area of the touch screen that was touched.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

The illustrative embodiments provide a method, a mobile device, and a computer program product for locking a touch screen of a mobile device. The method comprises playing, via a processor of a mobile device, video content on a display of the mobile device. The display has a touch screen interface. The method further includes detecting, via a motion sensor, movement of the mobile device, and calculating a movement value of the mobile device. The method further includes determining if the movement value is greater than a movement value threshold, and in response to determining that the movement value is greater than the movement value threshold, triggering a sensor component to detect activity data associated with a current use of the mobile device. The method further includes determining if the detected activity data matches reference activity data corresponding to use of the mobile device by a specific user of the mobile device. The method further includes, in response to determining that the detected activity data does not match the reference activity data, rejecting inputs to the touch screen interface to prevent interruption of the playing and displaying of the video content.

According to another embodiment, a mobile device comprises a memory, a display including a touch screen interface, a sensor component, a motion sensor that detects movement of the mobile device and at least one processor communicatively coupled to the memory, the display, the touch screen interface, the sensor component and the motion sensor. The memory has stored thereon a touch screen locking module for locking the touch screen interface of the mobile device. The at least one processor executes program code of the touch screen locking module which enables the mobile device to play and display video content on the display and detect, via the motion sensor, movement of the mobile device while playing the video content. The mobile device is further enabled to calculate a movement value of the mobile device, determine if the movement value is greater than a movement value threshold, and in response to determining that the movement value is greater than the movement value threshold, trigger a sensor component to detect activity data associated with a current use of the mobile device. The mobile device is further enabled to determine if the detected activity data matches reference activity data corresponding to use of the mobile device by a specific user of the mobile device and, in response to determining that the detected activity data does not match the reference activity data, reject inputs to the touch screen interface to prevent interruption of the playing and displaying of the video content.

According to an additional embodiment, a computer program product includes a computer readable storage device with program code stored thereon which, when executed by one or more processors of a mobile device having a display including a touch screen interface, a sensor component, a motion sensor and a memory, enables the mobile device to complete the functionality of playing video content on the display and detecting, via the motion sensor, movement of the mobile device. The computer program product further enables the mobile device to calculate a movement value of the mobile device, determine if the movement value is greater than a movement value threshold and in response to determining that the movement value is greater than the movement value threshold, trigger a sensor component to detect activity data associated with a current use of the mobile device. The computer program product further enables the mobile device to determine if the detected activity data matches reference activity data corresponding to use of the mobile device by a specific user of the mobile device and, in response to determining that the detected activity data does not match the reference activity data, reject inputs to the touch screen interface to prevent interruption of the playing and displaying of the video content.

The above contains simplifications, generalizations and omissions of detail and is not intended as a comprehensive description of the claimed subject matter but, rather, is intended to provide a brief overview of some of the functionality associated therewith. Other systems, methods, functionality, features, and advantages of the claimed subject matter will be or will become apparent to one with skill in the art upon examination of the following figures and the remaining detailed written description. The above as well as additional objectives, features, and advantages of the present disclosure will become apparent in the following detailed description.

In the following description, specific example embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from the general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various aspects are described which may be aspects for some embodiments but not other embodiments.

The terminology used herein is for the purpose of describing particular embodiments only and is not intended to be limiting of the disclosure. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Moreover, the use of the terms first, second, etc. do not denote any order or importance, but rather the terms first, second, etc. are used to distinguish one element from another.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be provided its broadest interpretation given the context in which that term is utilized.

Those of ordinary skill in the art will appreciate that the hardware components and basic configuration depicted in the following figures may vary. For example, the illustrative components within mobile device 100 are not intended to be exhaustive, but rather are representative to highlight components that can be utilized to implement the present disclosure. For example, other devices/components may be used in addition to, or in place of, the hardware depicted. The depicted example is not meant to imply architectural or other limitations with respect to the presently described embodiments and/or the general disclosure.

Within the descriptions of the different views of the figures, the use of the same reference numerals and/or symbols in different drawings indicates similar or identical items, and similar elements can be provided similar names and reference numerals throughout the figure(s). The specific identifiers/names and reference numerals assigned to the elements are provided solely to aid in the description and are not meant to imply any limitations (structural or functional or otherwise) on the described embodiments.

Figure 1:
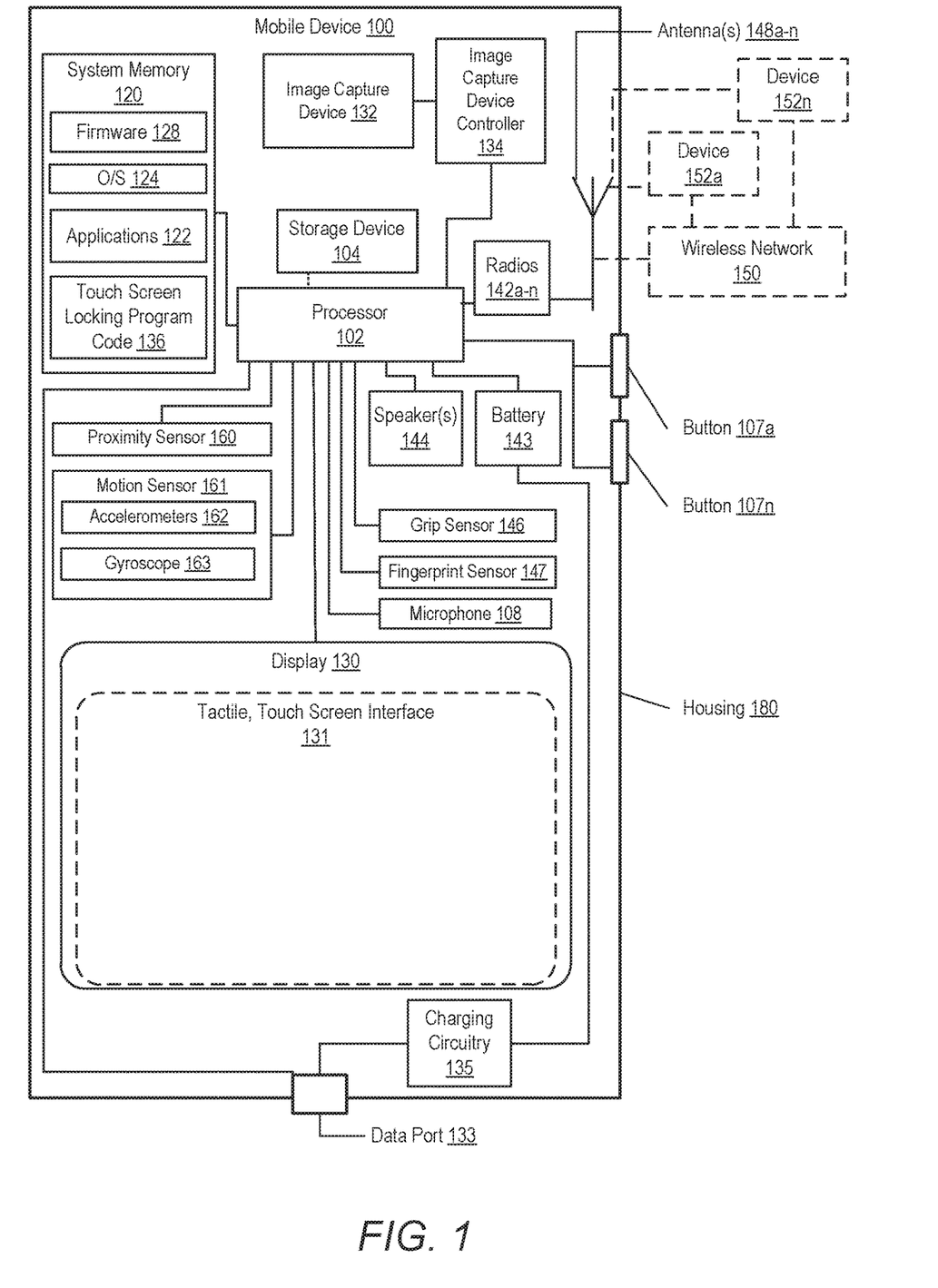
FIG. 1 depicts an example mobile device within which various aspects of the disclosure can be implemented, according to one or more embodiments.

FIG. 1 depicts example mobile device 100 within which various aspects of the disclosure can be implemented, according to one or more embodiments. Examples of such mobile devices include, but are not limited to, a notebook computer, a mobile phone, a digital camera, and a tablet computer, etc. Mobile device 100 includes processor 102, which is communicatively coupled to storage device 104, system memory 120, display 130, and image capture device controller 134.

System memory 120 may be a combination of volatile and non-volatile memory, such as random access memory (RAM) and read-only memory (ROM). System memory 120 can store program code or similar instructions associated with firmware 128, an operating system 124, applications 122, and touch screen locking program code 136. Although depicted as being separate from the applications 122, touch screen locking program code 136 may also be implemented as an application. Processor 102 loads and executes program code stored in system memory 120. Examples of program code that may be loaded and executed by processor 102 include program code associated with applications 122 and program code associated with touch screen locking program code 136.

In one embodiment, image capture device 132 is communicatively coupled to image capture device controller 134, which is communicatively coupled to processor 102. Image capture device 132 can capture images that are within the field of view of image capture device 132.

Mobile device 100 can further include data port 133 coupled with processor 102, charging circuitry 135, and battery 143. Mobile device 100 further includes microphone 108, one or more speakers 144, and one or more buttons 107*a-n*. Buttons 107*a-n* may provide controls for volume, power, and a camera. Mobile device 100 further includes radios 142*a-n*, which are coupled to antennas 148*a-n*. In this example, radios 142*a-n* and antennas 148*a-n* allow mobile device 100 to communicate wirelessly with devices 152*a-n* via wireless network 150.

Display 130 can be one of a wide variety of display screens or devices, such as a liquid crystal display (LCD) and an organic light emitting diode (OLED) display. In the illustrated embodiments, display 130 is a touch screen device that includes a tactile, touch screen interface 131 that allows a user to provide tactile/touch input to or control mobile device 100 by touching the display screen.

Mobile device 100 further includes proximity sensor 160 and motion sensor(s) 161. Motion sensor(s) 161 can include one or more accelerometers 162 and gyroscope 163. Proximity sensor 160 can be an infrared (IR) sensor that detects the presence of a nearby object. Motion sensor(s) 161 can detect movement of mobile device 100 and provide motion data to processor 102 that indicate the spatial orientation and movement of mobile device 100. Accelerometers 162 measure linear acceleration of movement of mobile device 100 in multiple axes (X, Y and Z). For example, accelerometers 162 can include three accelerometers, where one accelerometer measures linear acceleration in the X axis, one accelerometer measures linear acceleration in the Y axis, and one accelerometer measures linear acceleration in the Z axis. Gyroscope 163 measures rotation or angular rotational velocity of mobile device 100.

Accelerometers 162 measure the difference between linear acceleration in the accelerometer's reference frame and the earth's gravitational field vector. In one embodiment, accelerometers 162 can be piezoelectric devices or micro electro-mechanical systems (MEMS) that convert mechanical motion into an electrical signal. This electrical signal can be processed to determine orientation. In the absence of linear acceleration, the accelerometer output is a measurement of the rotated gravitational field vector. Multiple accelerometers can be used to determine orientation of a device in yaw, pitch and roll orientation angles. Accelerometers 162 provide vector data for each axis that includes a magnitude of acceleration and the direction of the acceleration. In one embodiment, the magnitude output from accelerometers 162 can be in units of meters per second squared. Vector algebra can be used to calculate corresponding orientation angles in yaw, pitch and roll of mobile device 100 based on the accelerometer data.

Mobile device 100 further includes other sensor components such as grip sensors 146 and fingerprint sensor 147. Grip sensors 146 are pressure or tactile sensors that are arranged on the peripheral edge of housing 180 of mobile device 100. Grip sensors 146 measure the force applied by a user's hand to the housing 180. Fingerprint sensor 147 can scan the finger of a user and generate fingerprint data corresponding to the user's fingerprint. A user places his/her finger over the fingerprint sensor in order to initiate scanning of the fingerprint. Fingerprint sensor 147 can be used to identify a user of mobile device 100 and allow or deny access to mobile device 100.

Figure 2:
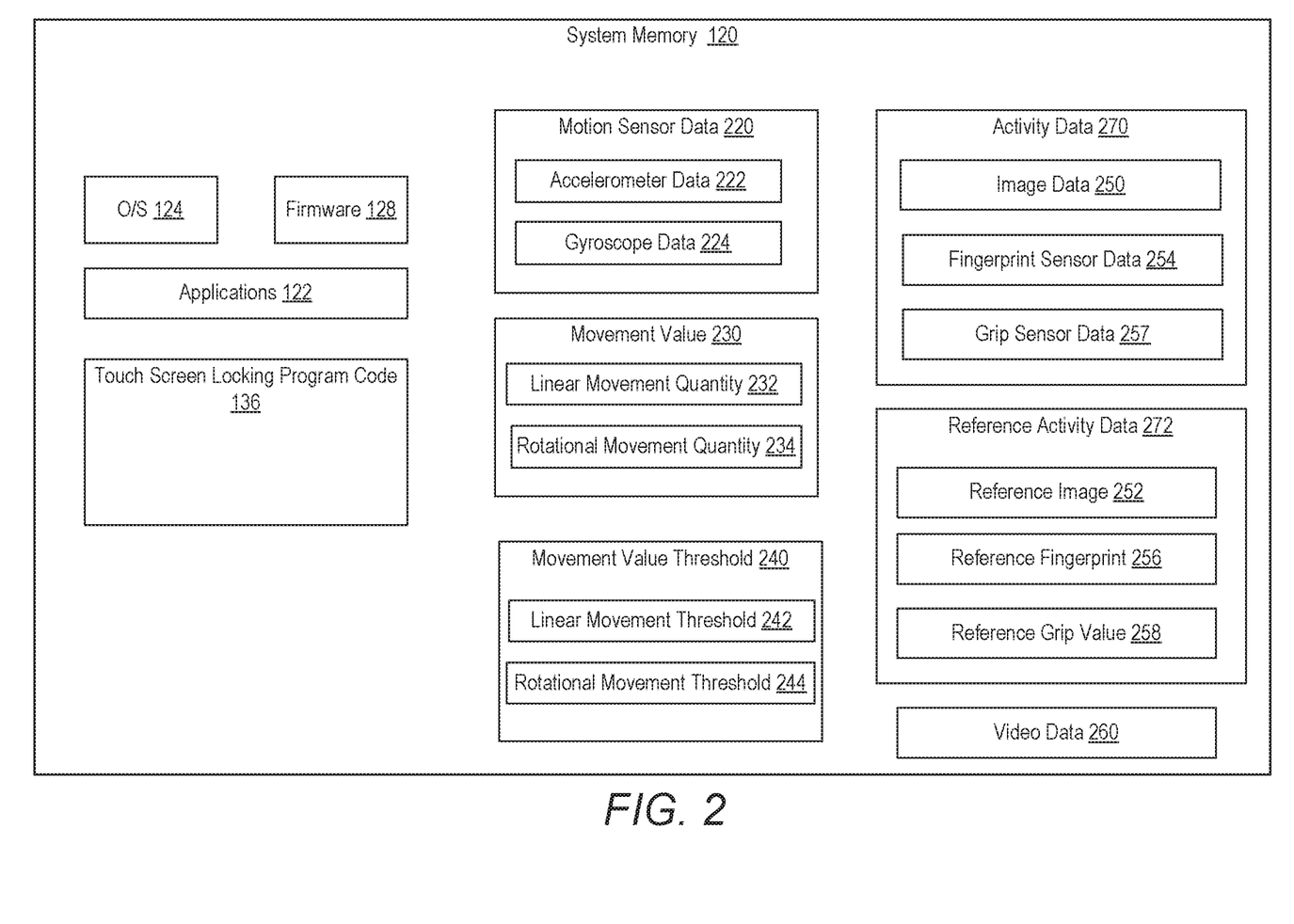
FIG. 2 is a block diagram of example contents of the system memory of a mobile device, according to one or more embodiments.

In the description of each of the following figures, reference is also made to specific components illustrated within the preceding figure(s). With reference now to FIG. 2, one embodiment of example contents of system memory 120 of mobile device 100 is shown. System memory 120 includes data, software, and/or firmware modules, including firmware 128, operating system 124, applications 122, and touch screen locking program code 136. Touch screen locking program code 136 enables the automatic locking or disabling of touch screen interface 131 when mobile device 100 is physically moved from an authenticated user associated with operating mobile device 100 to another person or non-authenticated user. In one embodiment, touch screen locking program code 136 performs the processes presented in the flowcharts of FIGS. 4 and 5, as will be described below.

System memory 120 further includes motion sensor data 220 and movement value 230. Motion sensor data 220 comprises motion sensor data (220) received from motion sensor 161. Motion sensor data 220 includes accelerometer data 222 received from accelerometers 162 and gyroscope data 224 received from gyroscope 163. Accelerometer data 222 contains linear acceleration values in multiple axes (X, Y and Z) for a period of time. After the period of time, the values are written over with new linear acceleration values. Gyroscope data 224 contains rotation or angular rotational velocity values for a period of time. After the period of time, the values are written over with new rotation or angular rotation velocity values.

Movement value 230 is a calculated value that indicates an amount of movement of mobile device 100. Movement value 230 includes linear movement quantity 232 and rotational movement quantity 234. Linear movement quantity 232 is based on accelerometer data 222 and rotational movement quantity 234 is based on accelerometer data 222 and/or gyroscope data 224. Movement value 230 is a combination of linear movement quantity 232 and rotational movement quantity 234. In one embodiment, linear movement quantity 232 represents the amount of linear physical movement of mobile device 100 measured for a pre-determined time period and rotational movement quantity 234 represents the amount of rotational physical movement of mobile device 100 measured for a pre-determined time period.

System memory 120 further includes movement value threshold 240. Movement value threshold 240 comprises linear movement threshold 242 and rotational movement threshold 244. Linear movement threshold 242 is a minimum amount of linear movement that, when exceeded, indicates that mobile device 100 may have been moved from one user to another person. Rotational movement threshold 244 is a minimum amount of rotational angle change that, when exceeded, indicates that mobile device 100 may have been moved from one user to another person. In one embodiment, linear movement threshold 242 can be 10 centimeters and rotational movement threshold 244 can be 30 degrees. Movement value threshold 240 is a combination of linear movement threshold 242 and rotational movement threshold 244. If either linear movement threshold 242 or rotational movement threshold 244 are exceeded, then mobile device 100 may have been moved from one user to another person.

In one example time period, if linear movement quantity 232 is calculated to be 15 centimeters and rotational movement quantity 234 is calculated to be 20 degrees, mobile device 100 is considered to possibly have been moved from one user to another person because the linear movement quantity 232 of 15 centimeters is greater than the linear movement threshold 242 of 10 centimeters.

System memory 120 also includes activity data 270 and reference activity data 272. Activity data 270 comprises image data 250, fingerprint sensor data 254 and grip sensor data 257. Reference activity data 272 comprises reference image 252, reference fingerprint 256 and reference grip value 258.

Image data 250 is an image taken or captured by image capture device 132. Reference image 252 is a stored authenticated image of the face of the authenticated user associated with mobile device 100. Fingerprint sensor data 254 is a scan taken or captured by fingerprint sensor 147. Reference fingerprint 256 is a stored authenticated fingerprint of the finger of the authenticated user associated with mobile device 100. Grip sensor data 257 is data taken or captured by grip sensor 146. Reference grip value 258 is a stored grip value of the hand of the authenticated user associated with mobile device 100.

System memory 120 also includes video data 260. Video data 260 can be a wide variety of video or video images that can be shown on display 130. For example, video data 260 can include movies, video clips, video phone calls, video chats, streaming video, and any other moving visual media.

Figure 3A:
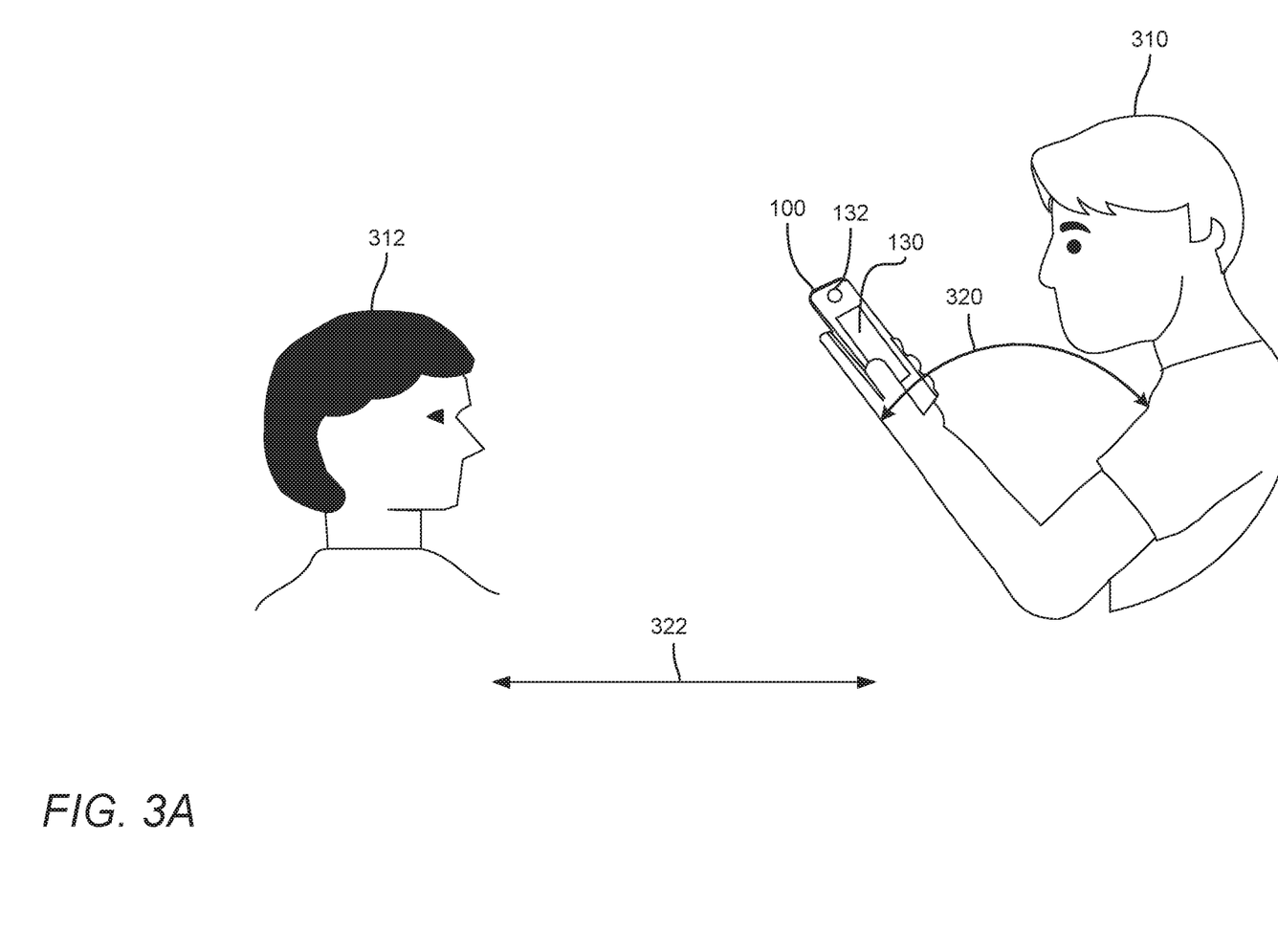
FIG. 3A is an example illustration of a mobile device playing a video, with the device being moved from an authenticated user to a non-authenticated user, according to one or more embodiments.

FIG. 3A illustrates an example of mobile device 100 being moved from a user associated with mobile device 100 (authenticated user 310) to another person (non-authenticated user 312). In one embodiment, authenticated user 310 can be the owner of mobile device 100 and non-authenticated user 312 can be a child or friend of user 310. Mobile device 100 can receive and store reference activity data 272 during initial setup that identifies the authenticated user of mobile device 100. Mobile device 100 can play video data 260 (video content) on display 130 for viewing by authenticated user 310 and/or non-authenticated user 312. Mobile device 100 can store a facial image (i.e., reference image 252) of the authenticated user 310 of mobile 100 that can be used by mobile device 100 to determine if authenticated user 310 is viewing display 130.

When mobile device 100 is being moved or passed from user 310 to non-authenticated user 312, mobile device 100 can travel a linear distance 322 between user 310 and the non-authenticated user 312. Similarly, when mobile device 100 is being moved or passed from user 310 to the non-authenticated user 312, mobile device 100 can also rotate a rotational angle 320 between user 310 and the non-authenticated user 312. Processor 102 calculates a distance traveled and a rotational orientation of mobile device 100 based on received motion sensor data 220. Processor 102 can further track the distance traveled and rotational orientation of mobile device 100 as the mobile device is moved over a period of time.

Mobile device 100 can be positioned with display 130 facing upwards for viewing by user 310. In this position, forward facing image capture device 132 faces the same direction as display 130 such that image capture device 132 faces the front of mobile device 100. In this position, image capture device 132 is positioned to capture an image (e.g., a self-portrait or "selfie") of user 310. Similarly, if another person or non-authenticated user 312 is holding mobile device 100, image capture device 132 would be positioned to capture an image (e.g., a self-portrait or "selfie") of the other person or non-authenticated user 312.

Figure 3B:
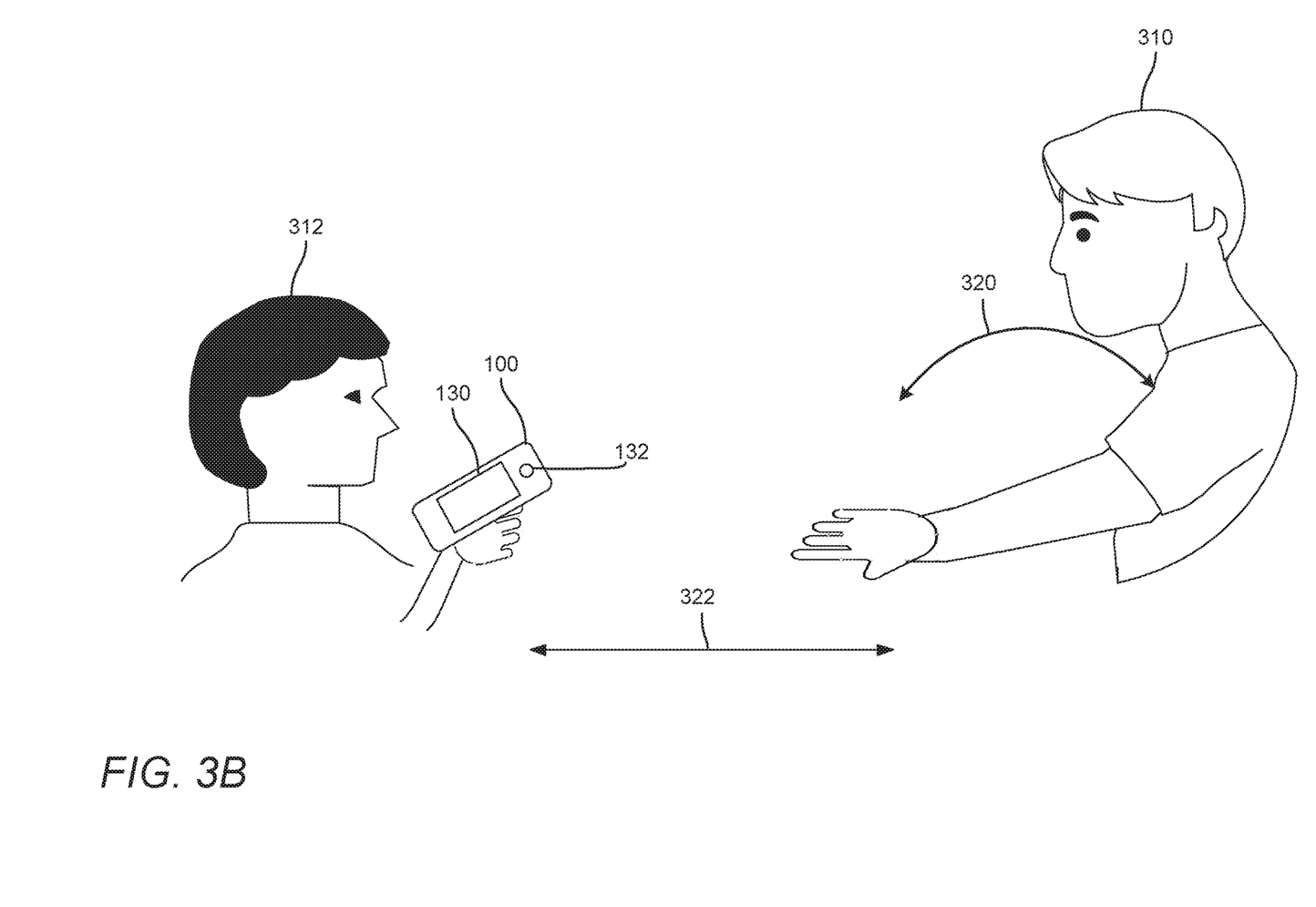
FIG. 3B is an example illustration of a mobile device playing a video, with the device being held by a non-authenticated user, according to one or more embodiments.

FIG. 3B illustrates an example of mobile device 100 being held by non-authenticated user 312. In FIG. 3B, mobile device 100 has been moved or passed from authenticated user 310 to non-authenticated user 312 and non-authenticated user 312 is viewing a video on display 130.

In one embodiment, processor 102, executing touch screen locking program code 136, can play video data 260 on display 130. Processor 102 detects, via motion sensor 161, movement of mobile device 100 and calculates movement value 230. Processor 102 determines if movement value 230 is greater than movement value threshold 240 and, in response to determining that movement value 230 is greater than movement value threshold 240, triggers a sensor component (i.e., image capture device 132, grip sensor 146 or fingerprint sensor 147) to detect activity data 270 (i.e., image data 250, fingerprint sensor data 254 or grip sensor data 257) associated with a current use of the mobile device. Processor 102 determines if the detected activity data matches at least one of reference activity data 272 (i.e., at least one of reference image 252, reference grip value 258 or reference fingerprint 256) corresponding to use of the mobile device by a specific authenticated user of the mobile device. In response to determining that the detected activity data does not match the reference activity data, processor 102 rejects inputs to the touch screen interface 131 to prevent interruption of the playing and displaying of the video content.

In one embodiment, when a video is playing in full screen mode on display 130, processor 102 can reject inputs to touch screen interface 131 when mobile device 100 has been moved linearly or rotated more than a pre-determined amount and processor 102 determines that image data 250 does not contain the face of the authenticated user 310 of mobile device 100.

According to one aspect, the present disclosure prevents unwanted inputs and actions to mobile device 100 when other persons or non-authenticated users 312 such as children and friends are viewing a video on mobile device 100 by rejecting inputs to touch screen interface 131. According to another aspect, the present disclosure prevents unwanted actions and inputs to mobile device 100 under certain conditions when an authenticated user is playing a video by rejecting inputs to touch screen interface 131. For example, if authenticated user 310 is playing a video with music and authenticated user 310 places mobile device 100 in his/her pocket, touch screen interface 131 can reject inputs, thus preventing unwanted inputs while mobile device 100 is in the pocket of authenticated user 310. According to an additional aspect, the present disclose identifies when activity data 270 indicates a hand-off of mobile device 100 to a non-authenticated user of the mobile device has occurred and, in response to identifying the hand-off, mobile device reconfigures touch screen interface 131 to reject inputs.

Figure 4:
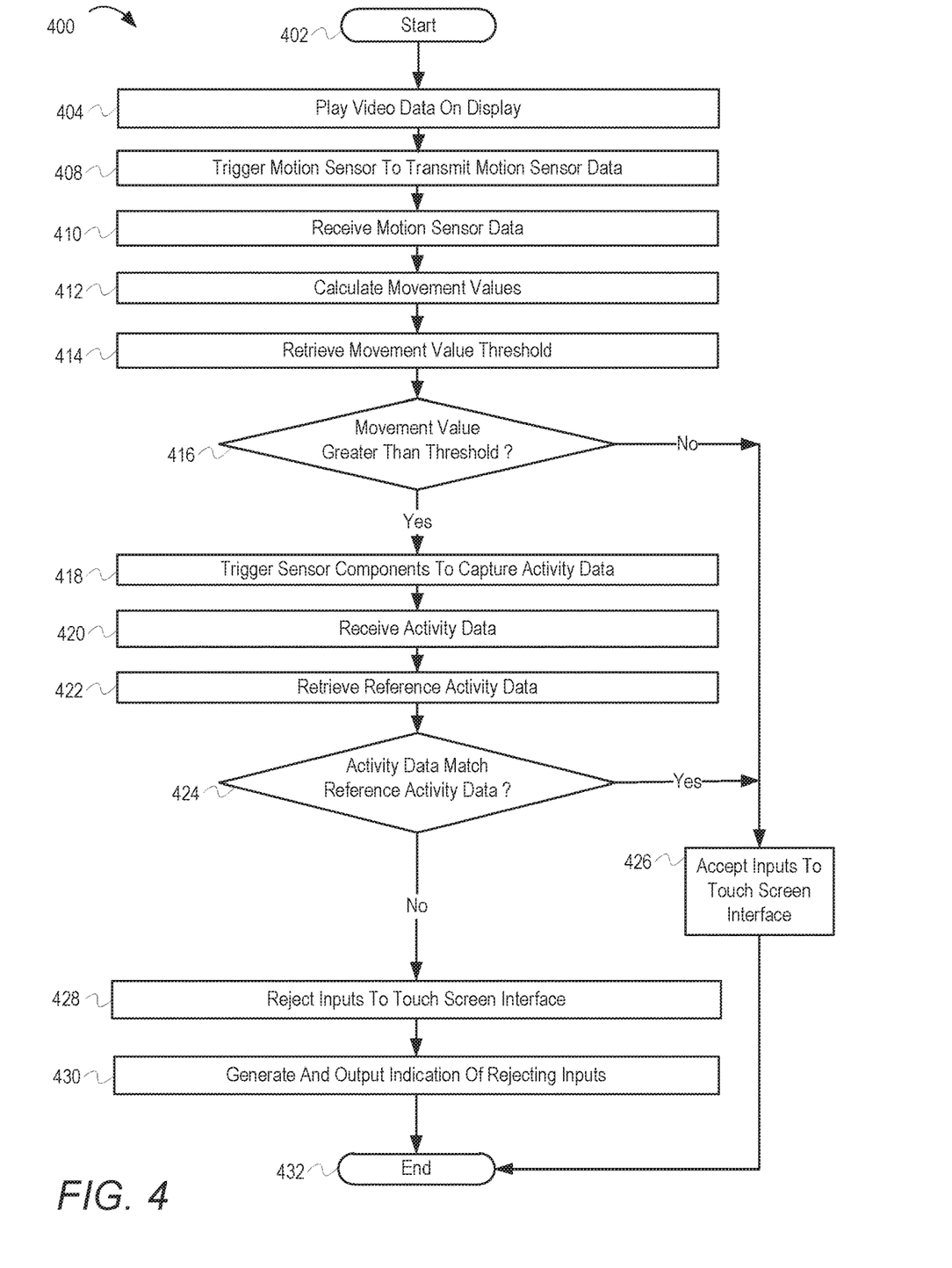
FIG. 4 depicts a flowchart of a method of locking a touch screen of a mobile device, according to one or more embodiments.
Figure 5:
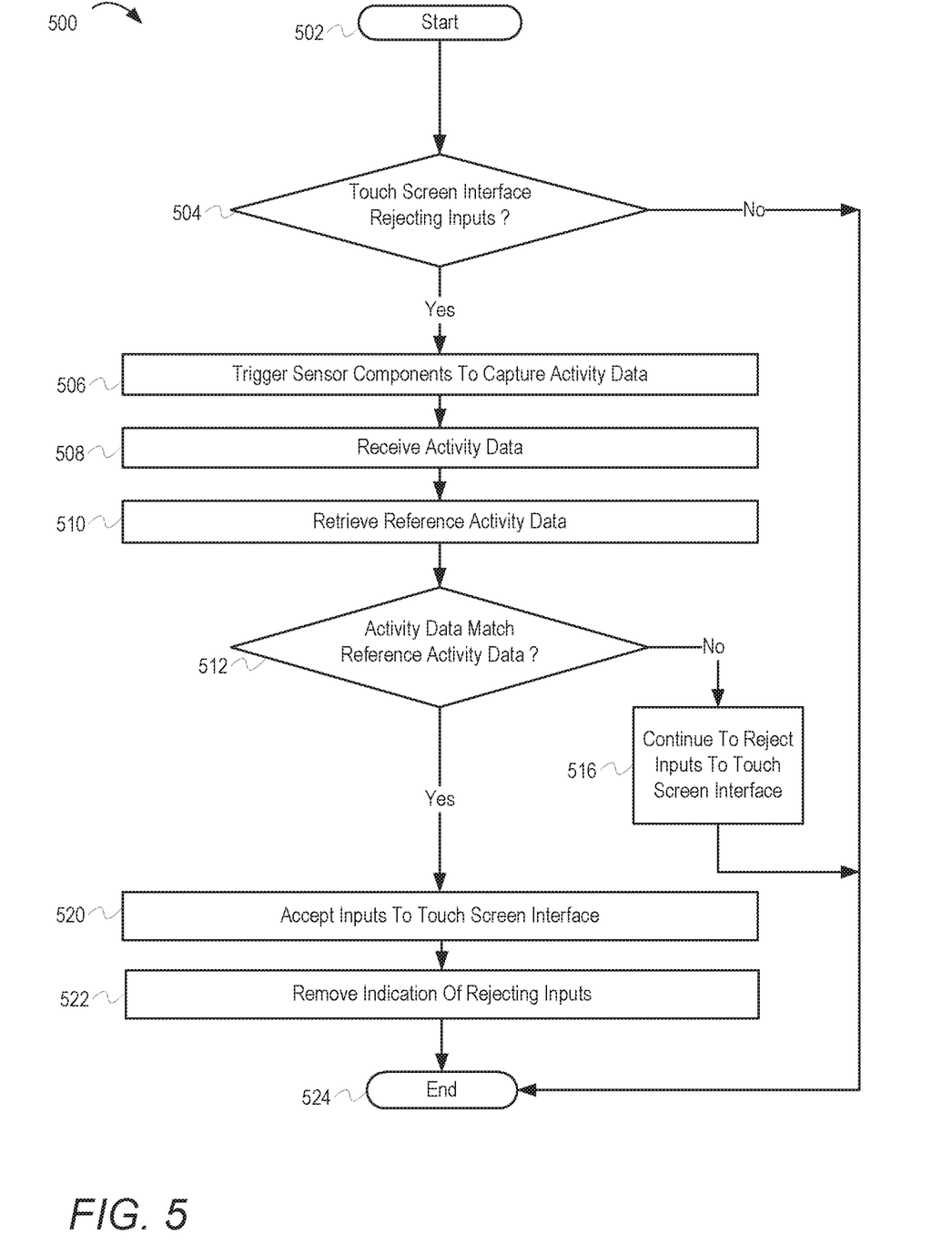
FIG. 5 depicts a flowchart of a method of unlocking a touch screen of a mobile device, according to one or more embodiments.

FIGS. 4 and 5 depict methods 400 and 500 for locking and unlocking a touch screen of a mobile device, according to one or more embodiments. The description of methods 400 and 500 will be described with reference to the components and examples of FIGS. 1-3. The operations depicted in FIGS. 4 and 5 can be performed by mobile device 100 or other suitable devices. For example, one or more of the processes of the methods described in FIGS. 4 and 5 may be performed by a processor (e.g., processor 102) executing program code associated with touch screen locking program code 136.

Method 400 begins at start block 402. At block 404, processor 102 plays video data 260 on display 130. In one embodiment, video data 260 can play in a full screen mode on display 130. In full screen mode, the video covers the full display or screen without a window-framing interface. Processor 102 triggers motion sensor 161 to transmit motion sensor data 220 to processor 102 (block 408). Processor 102 receives the motion sensor data 220 (block 410) and calculates movement values 230 based on the motion sensor data 220 (block 412). In one embodiment, processor 102 calculates movement value 230 including linear movement quantity 232 and rotational movement quantity 234 based on accelerometer data 222 and gyroscope data 224.

Processor 102 retrieves movement value threshold 240 from system memory 120 (block 414). Movement value threshold 240 includes linear movement threshold 242 and rotational movement threshold 244. At decision block 416, processor 102 determines if movement value 230 is greater than movement value threshold 240. Specifically, processor 102 determines if linear movement quantity 232 is greater than linear movement threshold 242 or if rotational movement quantity 234 is greater than rotational movement threshold 244. If either one of linear movement quantity 232 or rotational movement quantity 234 is greater than their corresponding threshold, then movement value 230 is determined to be greater than movement value threshold 240.

In response to determining that movement value 230 is greater than movement value threshold 240, processor 102 triggers or activates a sensor component (i.e., one or more of image capture device 132, grip sensor 146 and fingerprint sensor 147) to capture and transmit respective activity data 270 (i.e., one or more of image data 250, grip sensor data 257 and fingerprint sensor data 254) to processor 102 (block 418). In one embodiment, image capture device 132 can be located adjacent to display 130 such that image capture device 132 can capture facial images of viewers of display 130. Processor 102 receives activity data 270 (block 420) and retrieves reference activity data 272 (i.e., one or more of reference image 252, reference grip value 258 and reference fingerprint 256) from system memory 120 (block 422). In one embodiment, reference image 252 is the image associated with the authorized user of mobile device 100.

At decision block 424, processor 102 determines if activity data 270 matches one or more corresponding reference activity data 272. In response to determining that activity data 270 matches one or more of a corresponding respective reference activity data 272, processor 102, detects and accepts inputs to touch screen interface 131 (block 426). In other words, when an authenticated user is using mobile device 100 to view a video, touch screen interface 131 accepts inputs. Similarly, in response to determining that movement value 230 is not greater than movement value threshold 240 (decision block 416), processor 102 detects and accepts inputs to touch screen interface 131 such that the touch screen interface is active (block 426).

In response to determining that activity data 270 does not match reference activity data 272, processor 102, detects and rejects inputs to touch screen interface 131 (block 428). When inputs to touch screen interface 131 are rejected, the touch screen interface is inactive. In other words, when a non-authenticated user is using mobile device 100 to view a video, touch screen interface 131 does not accept inputs. In one embodiment, processor 102 generates and outputs to display 130 an indication that the touch screen interface 131 is currently set to reject inputs (block 430). In one embodiment, the indication that the touch screen interface 131 is currently set to reject inputs can be a floating icon that randomly moves on display 130. Method 400 then ends at end block 432.

FIG. 5 illustrates a method 500 for unlocking a touch screen of a mobile device. Method 500 begins at start block 502. At decision block 504, processor 102 determines if touch screen interface 131 is currently set to reject inputs. In response to determining that touch screen interface 131 is not currently set to reject inputs (i.e., touch inputs are currently being accepted/processed by touch screen interface 131), method 500 terminates at end block 524. In response to determining that touch screen interface 131 is currently set to reject inputs, processor 102 triggers a sensor component (i.e., one or more of image capture device 132, grip sensor 146 and fingerprint sensor 147) to capture and transmit corresponding activity data 270 (i.e., one or more of image data 250, grip sensor data 257 and fingerprint sensor data 254) to processor 102 (block 506). Processor 102 receives activity data 270 (block 508) and retrieves reference activity data 272 (i.e., one or more of reference image 252, reference fingerprint 256 and reference grip value 258) from system memory 120 (block 510). In one embodiment, reference image 252 is the image associated with the authenticated user of mobile device 100.

At decision block 512, processor 102 determines if the activity data 270 matches one or more corresponding reference activity data 272. In response to determining that activity data 270 does not match one or more of a corresponding reference activity data 272, processor 102 continues to reject inputs to touch screen interface 131 (block 516). Method 500 then ends.

In response to determining that activity data 270 matches reference activity data 272, processor 102 accepts inputs to touch screen interface 131 such that the touch screen interface is active and processes subsequently received inputs (block 520). Processor 102 removes, from display 130, the indication that the touch screen interface 131 is currently set to suspend processing of inputs (block 522). In one embodiment, the floating icon that randomly moves on display 130 can be removed or discontinued. Method 500 then ends at end block 524.

In the above-described methods of FIGS. 4 and 5, one or more of the method processes may be embodied in a computer readable device containing computer readable code such that operations are performed when the computer readable code is executed on a computing device. In some implementations, certain operations of the methods may be combined, performed simultaneously, in a different order, or omitted, without deviating from the scope of the disclosure. Further, additional operations may be performed, including operations described in other methods. Thus, while the method operations are described and illustrated in a particular sequence, use of a specific sequence or operations is not meant to imply any limitations on the disclosure. Changes may be made with regards to the sequence of operations without departing from the spirit or scope of the present disclosure. Use of a particular sequence is therefore, not to be taken in a limiting sense, and the scope of the present disclosure is defined only by the appended claims.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. Computer program code for carrying out operations for aspects of the present disclosure may be written in any combination of one or more programming languages, including an object-oriented programming language, without limitation. These computer program instructions may be provided to a processor of a general-purpose computer, special-purpose computer, or other programmable data processing apparatus to produce a machine that performs the method for implementing the functions/acts specified in the flowchart and/or block diagram block or blocks. The methods are implemented when the instructions are executed via the processor of the computer or other programmable data processing apparatus.

As will be further appreciated, the processes in embodiments of the present disclosure may be implemented using any combination of software, firmware, or hardware. Accordingly, aspects of the present disclosure may take the form of an entirely hardware embodiment or an embodiment combining software (including firmware, resident software, micro-code, etc.) and hardware aspects that may all generally be referred to herein as a "circuit," "module," or "system." Furthermore, aspects of the present disclosure may take the form of a computer program product embodied in one or more computer readable storage device(s) having computer readable program code embodied thereon. Any combination of one or more computer readable storage device(s) may be utilized. The computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage device can include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage device may be any tangible medium that can contain, or store a program for use by or in connection with an instruction execution system, apparatus, or device.

Where utilized herein, the terms "tangible" and "non-transitory" are intended to describe a computer-readable storage medium (or "memory") excluding propagating electromagnetic signals; but are not intended to otherwise limit the type of physical computer-readable storage device that is encompassed by the phrase "computer-readable medium" or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

As used herein, the term "or" is inclusive unless otherwise explicitly noted. Thus, the phrase "at least one of A, B, or C" is satisfied by any element from the set {A, B, C} or any combination thereof, including multiples of any element.

While the disclosure has been described with reference to example embodiments, it will be understood by those skilled in the art that various changes may be made and equivalents may be substituted for elements thereof without departing from the scope of the disclosure. In addition, many modifications may be made to adapt a particular system, device, or component thereof to the teachings of the disclosure without departing from the scope thereof. Therefore, it is intended that the disclosure not be limited to the particular embodiments disclosed for carrying out this disclosure, but that the disclosure will include all embodiments falling within the scope of the appended claims.

What is claimed is:

1. A method comprising:
    playing, via a processor of a mobile device, video content on a display of the mobile device, the display having a touch screen interface;
    detecting, via a motion sensor, movement of the mobile device;
    calculating a movement value of the mobile device;
    determining if the movement value is greater than a movement value threshold;
    in response to determining that the movement value is greater than the movement value threshold, triggering a sensor component to detect activity data associated with a current use of the mobile device;
    determining if the detected activity data matches reference activity data corresponding to use of the mobile device by a specific user of the mobile device; and
    in response to determining that the detected activity data does not match the reference activity data, rejecting inputs to the touch screen interface to prevent interruption of the playing and displaying of the video content.

2. The method of claim 1, further comprising:
    accepting inputs to the touch screen interface in response to determining that the movement value is not greater than the movement value threshold; and
    in response to determining that the activity data does match the reference activity data, accepting inputs to the touch screen interface.

3. The method of claim 1, further comprising:
    generating and outputting an indication that the touch screen interface is currently set to reject inputs.

4. The method of claim 1, the sensor component comprising at least one of:
    an image capture device, wherein the activity data comprises a presence of a visual image within a field of view of the image capture device; and
    a grip sensor, wherein the activity data comprises detection of a grip on the mobile device.

5. The method of claim 1, wherein the sensor component comprises an image capture device, and the method further comprises:
    subsequent to rejecting inputs to the touch screen interface, receiving image data from the image capture device;
    determining if the image data matches a reference image with pre-established authorization to override playback of the video content with a tactile input provided to the touch screen interface; and
    in response to determining that the image data matches the reference image, accepting inputs to the touch screen interface.

6. The method of claim 1, wherein the sensor component comprises at least one grip sensor, and the method further comprises:
    after rejecting inputs to the touch screen interface, receiving grip data from the grip sensor;
    determining if the grip data matches reference grip data associated with the specific user; and
    in response to determining that the grip data matches the reference grip data, accepting inputs to the touch screen interface.

7. The method of claim 1, further comprising:
    after rejecting inputs to the touch screen interface, receiving fingerprint data from a fingerprint sensor;
    determining if the fingerprint data matches a reference fingerprint; and
    in response to determining that the fingerprint data matches the reference fingerprint, accepting inputs to the touch screen interface.

8. The method of claim 1, wherein the video content is playing on the display in a full screen mode.

9. The method of claim 1, further comprising:
    identifying when the activity data indicates a hand-off of the mobile device to a non-authenticated user of the mobile device; and
    in response to identifying the hand-off, reconfiguring the touch screen interface to reject inputs.

10. A mobile device comprising:
a memory having stored thereon a touch screen locking module for locking a touch screen interface of the mobile device;
a display including a touch screen interface;
a sensor component;
a motion sensor that detects movement of the mobile device; and
at least one processor communicatively coupled to the memory, the display, the touch screen interface, the sensor component and the motion sensor, the at least one processor executing program code of the touch screen locking module which enables the mobile device to:
play video content on the display;
detect, via the motion sensor, movement of the mobile device;
calculate a movement value of the mobile device;
determine if the movement value is greater than a movement value threshold;
in response to determining that the movement value is greater than the movement value threshold, trigger a sensor component to detect activity data associated with a current use of the mobile device;
determine if the detected activity data matches reference activity data corresponding to use of the mobile device by a specific user of the mobile device; and
in response to determining that the detected activity data does not match the reference activity data, reject inputs to the touch screen interface to prevent interruption of the playing and displaying of the video content.

11. The mobile device of claim 10, wherein the processor is further enabled to:
accept inputs to the touch screen interface in response to determining that the movement value is not greater than the movement value threshold; and
in response to determining that the activity data does match the reference activity data, accept inputs to the touch screen interface.

12. The mobile device of claim 10, wherein the processor is further enabled to:
generate and output an indication that the touch screen interface is currently set to reject inputs.

13. The mobile device of claim 10, the sensor component comprising at least one of:
an image capture device, wherein the activity data comprises a presence of a visual image within a field of view of the image capture device; and
a grip sensor, wherein the activity data comprises detection of a grip on the mobile device.

14. The mobile device of claim 10, wherein the sensor component comprises an image capture device, and the processor is further enabled to:
subsequent to rejecting inputs to the touch screen interface, receive image data from the image capture device;
determine if the image data matches a reference image with pre-established authorization to override playback of the video content with a tactile input provided to the touch screen interface; and
in response to determining that the image data matches the reference image, accept inputs to the touch screen interface.

15. The mobile device of claim 10, wherein the sensor component comprises at least one grip sensor, and the processor is further enabled to:
after rejecting inputs to the touch screen interface, receive grip data from the grip sensor;
determine if the grip data matches reference grip data associated with the specific user; and
in response to determining that the grip data matches the reference grip data, accept inputs to the touch screen interface.

16. The mobile device of claim 10, wherein the processor is further enabled to:
after rejecting inputs to the touch screen interface, receive fingerprint data from a fingerprint sensor;
determine if the fingerprint data matches a reference fingerprint; and
in response to determining that the fingerprint data matches the reference fingerprint, accept inputs to the touch screen interface.

17. The mobile device of claim 10, wherein the video content is playing on the display in a full screen mode.

18. The mobile device of claim 10, wherein the processor is further enabled to:
identify when the activity data indicates a hand-off of the mobile device to a non-authenticated user of the mobile device; and
in response to identifying the hand-off, reconfigure the touch screen interface to reject inputs.

19. A computer program product comprising:
a computer readable storage device with program code stored thereon which, when executed by one or more processors of a mobile device having, a display including a touch screen interface, a sensor component, a motion sensor and a memory, enables the mobile device to complete the functionality of:
playing video content on the display;
detecting, via the motion sensor, movement of the mobile device;
calculating a movement value of the mobile device;
determining if the movement value is greater than a movement value threshold;
in response to determining that the movement value is greater than the movement value threshold, triggering a sensor component to detect activity data associated with a current use of the mobile device;
determining if the detected activity data matches reference activity data corresponding to use of the mobile device by a specific user of the mobile device; and
in response to determining that the detected activity data does not match the reference activity data, rejecting inputs to the touch screen interface to prevent interruption of the playing and displaying of the video content.

20. The computer program product of claim 19, wherein the program code for locking the touch screen interface comprises program code that further enables the mobile device to complete the functionality of:
accepting inputs to the touch screen interface in response to determining that the movement value is not greater than the movement value threshold; and
in response to determining that the activity data does match the reference activity data, accepting inputs to the touch screen interface.

* * * * *